United States Patent

[11] 3,607,655

[72] Inventors: Noboru Mukai; Masanobu Kawai, both of Machida-shi, Japan
[21] Appl. No.: 711,530
[22] Filed: Mar. 8, 1968
[45] Patented: Sept. 21, 1971
[73] Assignee: Kyowa Hakko Kogyo Co., Ltd. Tokyo, Japan
[32] Priority: Mar. 14, 1967, Dec. 1, 1967
[33] Japan
[31] 15578 and 76751

[54] PROCESS FOR PRODUCING MILK CLOTTING ENZYME
11 Claims, No Drawings

[52] U.S. Cl. .................................................. 195/66, 195/62, 99/116
[51] Int. Cl. ................................................... C12d 13/10, A23c 19/02
[50] Field of Search ..................................... 195/62, 66; 99/116

[56] References Cited
UNITED STATES PATENTS

| | | | |
|---|---|---|---|
| 3,212,905 | 10/1965 | Arima et al. | 99/116 |
| 3,275,453 | 9/1966 | Sardinas | 99/116 |

OTHER REFERENCES

Ozakai et al., Chemical Abstracts, Vol. 65, 1344 h to 1345 a (1966).

Primary Examiner—Lionel M. Shapiro
Attorney—Craig, Antonelli & Hill

ABSTRACT: A process for producing a milk clotting enzyme by fermentation which comprises culturing a micro-organism belonging to the genus Irpex, Fomitopsis, Coriolus or Lenzites in a nutrient medium under aerobic conditions. The enzyme accumulates in the culture liquor and may be recovered therefrom and treated so as to give a solid enzyme product useful, for example, in manufacturing cheese.

PROCESS FOR PRODUCING MILK CLOTTING ENZYME

This invention relates to a milk clotting coagulating enzyme. More particularly, it relates to a milk clotting enzyme and to a process for producing the same by fermentation. Even more particularly, the invention relates to a process for producing a milk clotting enzyme by fermentation with *Basidiomycetes*.

It is known in the prior art that rennet, which is obtained from the fourth stomach of the calf, is well known as a milk clotting enzyme which is indispensable for manufacturing cheese. A few milk clotting enzymes obtained by culturing micro-organisms have been found as substitute enzymes for rennet. An example thereof is the process for producing a milk clotting enzyme by mold which is described in Japanese Pat. publication No. 18830/65. However, very few, if any, processes have been found for producing milk clotting enzymes which are suitable for industrial production.

As the result of studies on hydrolyzing enzymes which are produced by culturing *Basidiomycetes*, the present inventors have found an enzyme which has a comparatively weak proteolytic action and a strong milk clotting power, namely, a milk clotting enzyme which is extremely useful for manufacturing cheese, which can be produced on an industrial scale at low cost.

Accordingly, one of the objects of the present invention is to provide an improved process for the production of a useful milk clotting or coagulating enzyme which overcomes the disadvantages and deficiencies of the prior art methods.

Another object of the present invention is to provide a process for producing a milk clotting enzyme by fermentation which may be carried out in an efficacious and simple manner.

A further object of the invention is to provide a process for producing a milk clotting enzyme by fermentation which may be carried out advantageously on an industrial scale at low cost to give a high yield of product.

A still further object of the invention is to provide a milk clotting enzyme.

These and other objects and advantages of the present invention will become apparent to those skilled in the art from a consideration of the following specification and claims.

In accordance with the present invention, it has been found that a milk clotting enzyme, useful, for example, for manufacturing cheese is produced by culturing *Basidiomycetes* belonging to the genera *Irpex*, *Fomitopsis*, *Coriolus* and *Lenzites*. A solid medium may be used as the culture medium for culturing these micro-organisms. Usually, it is industrially more advantageous to use a liquid medium. There are many changes wherein especially excellent results are obtained in the case of culturing effected with aeration and agitation.

Either a synthetic culture medium or a natural nutrient medium is suitable in the present invention as long as it contains the essential nutrients for the growth of the strain employed. Such nutrients include substances such as a carbon source, a nitrogen source, inorganic compounds and the like which are utilizable by the micro-organism employed in appropriate amounts. Thus, as a carbon source, there may be mentioned, by way of example, carbohydrates such as starch, dextrin, sucrose, lactose, maltose, glucose, blackstrap molasses, starch hydrolysate, etc., or any other suitable carbon source such as wood hydrolysate, etc. These substances may be used either singly or in mixtures of two or more. As a nitrogen source, various kinds of inorganic or organic salts or compounds, such as ammonium chloride, ammonium sulfate, ammonium nitrate, ammonium acetate, ammonium phosphate, etc., or natural substances containing nitrogen, such as cornsteep liquor, yeast extract, meat extract, peptone, fish meal, bouillon, casein hydrolysate, soybean powder, wheat bran, yeast, fish solubles, rice bran extract, etc. may be employed. Again, these substances may be used either singly or in combinations of two or more. Inorganic compounds which may be added to the culture medium include salts, such as phosphates, magnesium salts, zinc salts, copper salts, iron salts, etc., for example magnesium sulfate, sodium phosphate, potassium dihydrogen phosphate, potassium monohydrogen phosphate, iron sulfate, manganese chloride, calcium chloride, sodium chloride and the like. Furthermore, nutrients such as vitamins, growth-promoting substances, for example, biotin or amino acids such as glutamic acid or aspartic acid, and the like may be suitably added to the medium as desired.

A typical preferred composition of the culture medium is, in the case of an aeration-agitation culture, for example, the combination of ammonium chloride, starch and inorganic salts. Other typical culturing compositions are shown in the Examples hereinbelow.

Culturing is conducted under aerobic conditions at a culturing temperature of preferably about 25° to 35° C. The pH of the medium during culturing should be kept within the range of from 2 to 7. Usually, culturing is conducted for 2–10 days.

A milk clotting enzyme is produced by culturing as described above. When the enzyme is recovered from the cultured liquor, the culture filtrate obtained by filtering the micro-organism cells can be concentrated or solidified according to conventional methods such as an enzyme purification method and the like, for example, precipitation with an organic solvent, salting out, concentration under reduced pressure, absorption and desorption and the like. Processes wherein inorganic salts such as ammonium sulfate, sodium chloride, etc., or organic solvents such as methanol, acetone, isopropyl alcohol etc. are added to the enzyme solution are means which are the most easily utilizable. The amounts of the inorganic salts or organic solvents added vary with the particular agent used. For example, the milk clotting enzyme is precipitated by adding ammonium sulfate in a saturating amount of 60–70 % by weight or by adding most kinds of water-soluble solvents in an amount of 100–250% V/V. With these concentrations, impurities soluble in each solution can be precipitated.

As noted above, the present invention is carried out by culturing micro-organisms belonging to the genera *Irpex*, *Fomitopsis*, *Coriolus* or *Lenzites* in an aqueous nutrient medium. These micro-organisms are described in "Genshoku Nippon Kinrui Zukan" [(Colored Encyclopedia of Japanese Micro-organisms), vol. 1, 1957 and vol. 2, 1965, published by Hoiku-sha, and "Genera of Polyproraceae of Nippon" (Bulletin of the Tokyo Kagaku Museum, No. 6, 1–111, (1943)]Use of these micro-organisms for producing a milk clotting enzyme has not hitherto been known in the prior art, and this represents one of the novel findings of the present invention.

The following Examples are given merely as illustrative of the present invention and are not to be considered as limiting. Unless otherwise noted, the percentages therein and throughout the application are by weight.

EXAMPLE I

Twenty liters of a culture medium containing 5% of starch, 0.3% of ammonium chloride, 0.3% of yeast extract and inorganic salts is prepared and sterilized. It has a pH of 5.5. Thereafter, hypha of a strain belonging to the genus *Irpex lacteus* Fr. IFO5367 (IFO: Institute for Fermentation, Osaka, Japan) are inoculated into the medium. Culturing is then conducted at 30° C. and 400 r.p.m. with aeration at the rate of 15 l./min. for 90 hours.

After the completion of culturing, the milk clotting strength of the culture filtrate obtained by filtering the micro-organism cells is 600 $\mu$/ml. One unit of milk clotting strength is represented by the amount of enzyme necessary to start the coagulation of 1 ml. of commercial milk, containing 0.002 M of calcium chloride and the pH thereof being adjusted to 5.8, at 35° in 40 minutes.

Subsequently, ammonium sulfate is added to the culture filtrate in a saturating amount of 70% by weight. The separated precipitate is collected by centrifugal separation, dissolved in a small amount of distilled water and dialyzed overnight against flowing water. The inner solution of dialysis is freeze-dried. The resultant standard product enzyme shows a milk clotting strength of 750 $\mu$/mg.

The whole was passed into an oven at 150° C., and kept there for 1-2 minutes. Thereafter, onto the previous layer a second layer (foamed) was spread, which consisted of:

| | |
|---|---|
| PVC, paste making resin, having a K-value of 72 | 100 parts (by weight) |
| dioctyl phthalate | 80 parts (by weight) |
| azodicarbonamide | 2 parts (by weight) |
| dibasic lead phthalate (stabilizing kicker) | 2 parts (by weight) |
| TiO$_2$ | 5 parts (by weight) |
| polypropylene flakes | 5 parts (by weight) |

The initial thickness of this layer was 200 microns.

The whole was then passed into an oven at 200° C. and kept there for 1-2 minutes. The release paper was then removed. The system was then subjected to a slight tension in order to facilitate the separation of those components that were incompatible with each other; then the system was coupled to a cotton jersey fabric (with the second layer adjacent to the fabric), after preliminarily having spread on the fabric some plastisol of the first layer which served as a binder. Said coupling occurred in about 1 minute in an oven heated to 150-170° C.

The poromeric material thus obtained showed the following air transpiration rates:

| Pressure (mm. Hg) | cm.$^3$ of air Hr. cm.$^2$ |
|---|---|

The release paper was then removed and the system was subjected to a slight tension and subsequently was coupled to a jersey fabric made of polyamide fibers, the second layer being adjacent to the fabric after preliminary having spread on the fabric some plastisol of the first layer which serves as a binder.

The poromeric material thus obtained shows the following air transpiration rates:

| Pressure (mm.Hg) | cm.$^3$ of air hr. cm.$^2$ |
|---|---|
| 20 | 2.0 |
| 40 | 80 |
| 60 | 121 |
| 100 | 205 |
| 150 | 270 |

Example 3

On a device for the preparation of artificial leather substrate of release paper was spread coated with a plastisol consisting of (layer 1, compact):

| | |
|---|---|
| PVC, paste making resin with a K-value = 70 | 100 parts (by weight) |